(12) United States Patent
Hashimoto et al.

(10) Patent No.: US 6,690,550 B1
(45) Date of Patent: Feb. 10, 2004

(54) ROTATION BALANCE CONTROL MECHANISM CONTROLLING A ROTATION BALANCE OF A ROTARY HEAD DRUM APPARATUS

(75) Inventors: Katsuhiro Hashimoto, Hiratsuka (JP); Masato Hiramatsu, Isehara (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/461,969

(22) Filed: Dec. 15, 1999

(30) Foreign Application Priority Data

Dec. 24, 1998 (JP) ............................................. 10-368098

(51) Int. Cl.⁷ ........................ G11B 21/04; G11B 21/18; G11B 5/52
(52) U.S. Cl. .................................................. 360/271.7
(58) Field of Search ............................ 360/83, 84, 240, 360/270, 271, 271.1, 271.6, 271.7, 241, 128, 130.21, 130.22, 130.2, 130.23, 130.24

(56) References Cited

U.S. PATENT DOCUMENTS

| | | | |
|---|---|---|---|
| 5,051,852 A | 9/1991 | Kohno et al. | 360/84 |
| 5,684,652 A * | 11/1997 | Nakatsu et al. | 360/77.16 |
| 5,907,458 A | 5/1999 | Choi | 360/271.1 |
| 6,449,000 B1 * | 9/2002 | Suzuki | 347/260 |

FOREIGN PATENT DOCUMENTS

| | | | |
|---|---|---|---|
| GB | 2273810 | | 6/1994 |
| GB | 2300962 | | 11/1996 |
| JP | 4-1365444 A | * | 5/1992 |
| JP | 684152 | | 3/1994 |
| JP | 11185230 | | 7/1999 |
| JP | 11203638 | | 7/1999 |

* cited by examiner

*Primary Examiner*—Julie Anne Watko
(74) *Attorney, Agent, or Firm*—Ladas & Parry

(57) ABSTRACT

A rotation balance control mechanism controlling a rotation balance of a rotary head drum apparatus comprising a fixed drum and a rotary drum and a drum motor unit urging the rotary drum, the rotation balance control mechanism comprising a rotor plate mounted on a shaft mount of the drum motor, the rotor plate capable of mounting a balance weight for controlling the rotation balance of the rotary head drum apparatus.

7 Claims, 2 Drawing Sheets

ROTATION BALANCE CONTROL MECHANISM CONTROLLING A ROTATION BALANCE OF A ROTARY HEAD DRUM APPARATUS

BACKGROUND OF THE INVENTION

1. Field of the Invention

The present invention relates generally to a rotation balance control mechanism controlling a rotation balance of a rotary head drum apparatus, and more particularly, to a rotary head drum apparatus rotation balance control mechanism capable of effectively controlling the balance of the rotary head drum apparatus at high rotation speeds.

2. Description of the Related Art

A rotary head drum apparatus comprising a fixed drum and a rotary drum is built into a variety of types of electronic recording/reproducing equipment, including for example a videocassette tape recorder (VCR) or digital audio tape recorder (DAT). Such a rotary head drum apparatus requires that the magnetic tape that functions as the recording medium be wound helically around the rotary head drum, so the rotary head drum is mounted on a main chassis in an inclined or tilted state, that is, at an angle to the surface of the chassis.

Conventionally, as a method for adjusting or controlling the rotation balance of the tilted rotary drum of such a rotary head drum apparatus, the mounting of a balance weight for adjusting the balance of the rotary drum is known.

However, although the rotation speed of the rotary drum has conventionally been approximately 4,000 rpm, a growing the need to increase the speed with which data is transferred to and from the magnetic tape now requires rotation speeds of approximately 12,000 rpm. At such high rotation speeds the rotary drum begins to oscillate, causing the track of the head to wobble and adversely affecting the apparatus itself as well as the magnetic tape. The conventional balance control method is inadequate at such high rotation speeds of the rotary drum.

SUMMARY OF THE INVENTION

Accordingly, it is a general object of the present invention to provide an improved and useful rotation balance control mechanism controlling a rotation balance of a rotary head, in which the disadvantages described above are eliminated.

The above-described object of the present invention is achieved by a rotation balance control mechanism controlling a rotation balance of a rotary head drum apparatus comprising a fixed drum and a rotary drum and a drum motor unit urging the rotary drum, the rotation balance control mechanism comprising a rotor plate mounted on a shaft mount of the drum motor, the rotor plate capable of mounting a balance weight for controlling the rotation balance of the rotary head drum apparatus.

According to the invention described above, oscillation generated by the high speed of rotation of the rotary drum can be effectively reduced, thereby stabilizing the track of the head and reducing the adverse effects of poor head tracking on the apparatus itself as well as on the magnetic tape.

Additionally, the above-described object of the present invention is also achieved by the rotation balance control mechanism as described above, wherein:

a solder mount formed from solderable material is provided on at least one surface of the rotor plate; and soldering is formed as a balance weight on the solder mount.

According to the invention described above, the balance weight does not fly off at high rotation speeds.

Additionally, the above-described object of the present invention is also achieved by the rotation balance control mechanism as described above, wherein the solder mount comprises a plurality of solder portions arranged in concentric offset circles around a center point of the rotor plate.

According to the invention described above, the shape of the solder portions is not set but may be of a variety of shapes, including, for example, triangular or circular shapes. Additionally, provided that all such solder portions are of a predetermined shape and are spaced a predetermined distance apart, their positions may be changed in a radial direction. Additionally, the effect of the present invention may still be achieved even if the solder portions have a random shape, size and position.

As a result, it is possible to mount a balance weight of a preferred weight at a preferred position in both a direction of a radius of the rotor plate and a periphery of the rotor plate, thereby making rotational balance adjustment easy and accurate.

Additionally, the above-described object of the present invention is also achieved by the rotation balance control mechanism as described above, wherein the rotor plate is made of silicon steel.

According to the invention described above, iron loss caused by eddy-current loss as well as hysteresis loss can be reduced. Additionally, in place of the silicon steel plate a zinc-plated steel plate may be used instead, thus providing easy and accurate soldering. Additionally, in place of the silicon steel plate an ordinary steel plate may be used instead, thus reducing the cost of manufacture.

Additionally, the above-described object of the present invention is also achieved by the rotation balance control mechanism as described above, wherein the rotor plate comprises a two-layer structure, a first layer comprising a silicon steel plate on a side opposite a stator substrate of the drum motor, a second layer comprising an insulating material adjoining a back surface of the first layer, the solder mount being formed on the back surface of the first layer.

According to the invention described above, it is possible to provide a secure electromagnetic shield and at the same time securely form the solder mount capable of providing rotation balance control with ease and thus achieve the effects of the present invention. Additionally, forming the individual solder portions a predetermined distance apart interferes with heat transmission to an outer periphery of the rotor plate, thus reducing heat dissipation. It should be noted that in place of the silicon steel plate either a zinc-plated steel plate or an ordinary steel plate may be used instead.

Other objects, features and advantages of the present invention will become more apparent from the following detailed description when read in conjunction with the accompanying drawings.

DESCRIPTION OF THE PREFERRED EMBODIMENTS

A description will now be given of an embodiment of the present invention, with reference to the accompanying drawings.

Figure 1:
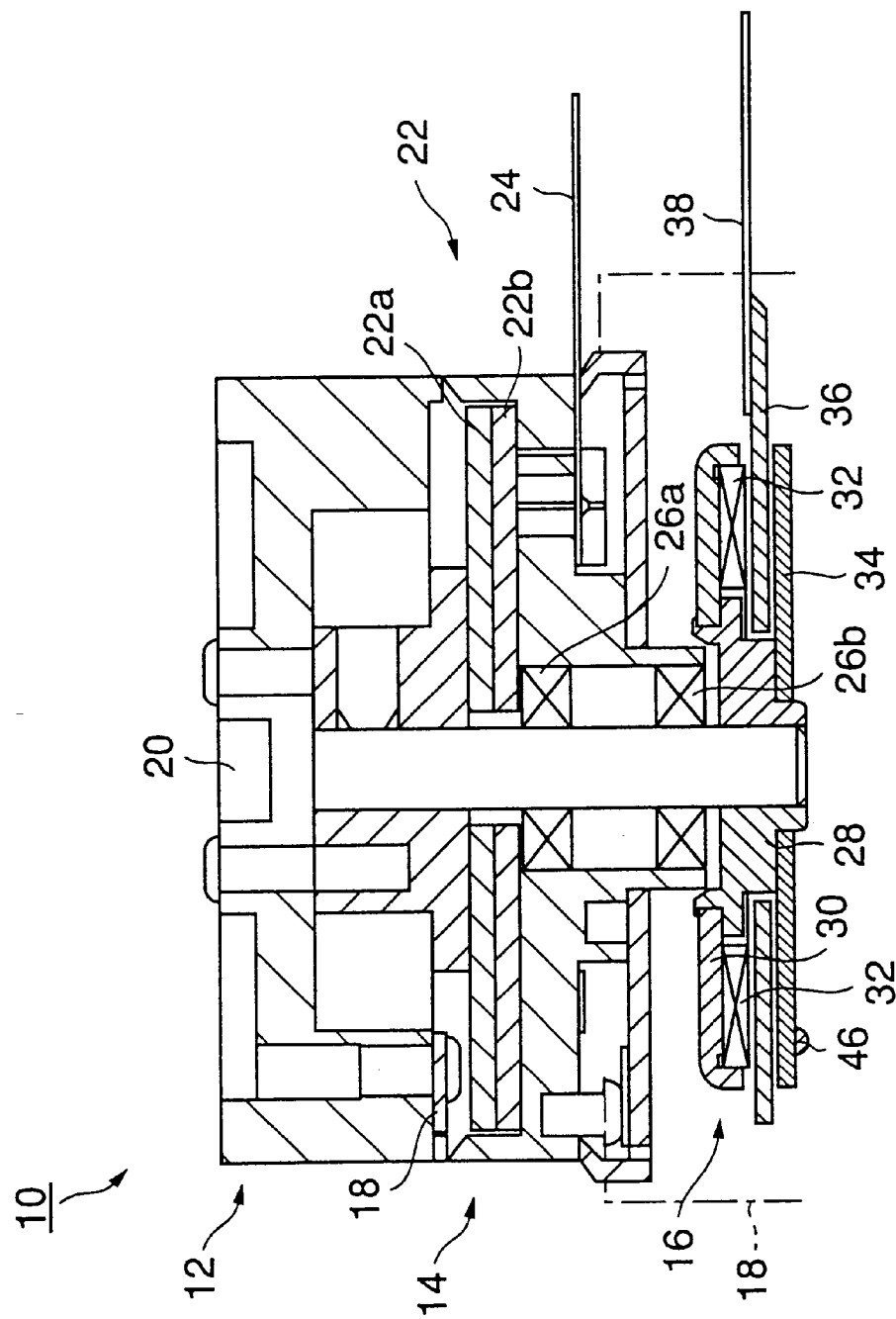
FIG. 1 is a schematic cross-sectional view of an embodiment of a rotary head drum apparatus rotation balance control mechanism according to the present invention.
Figure 2A:
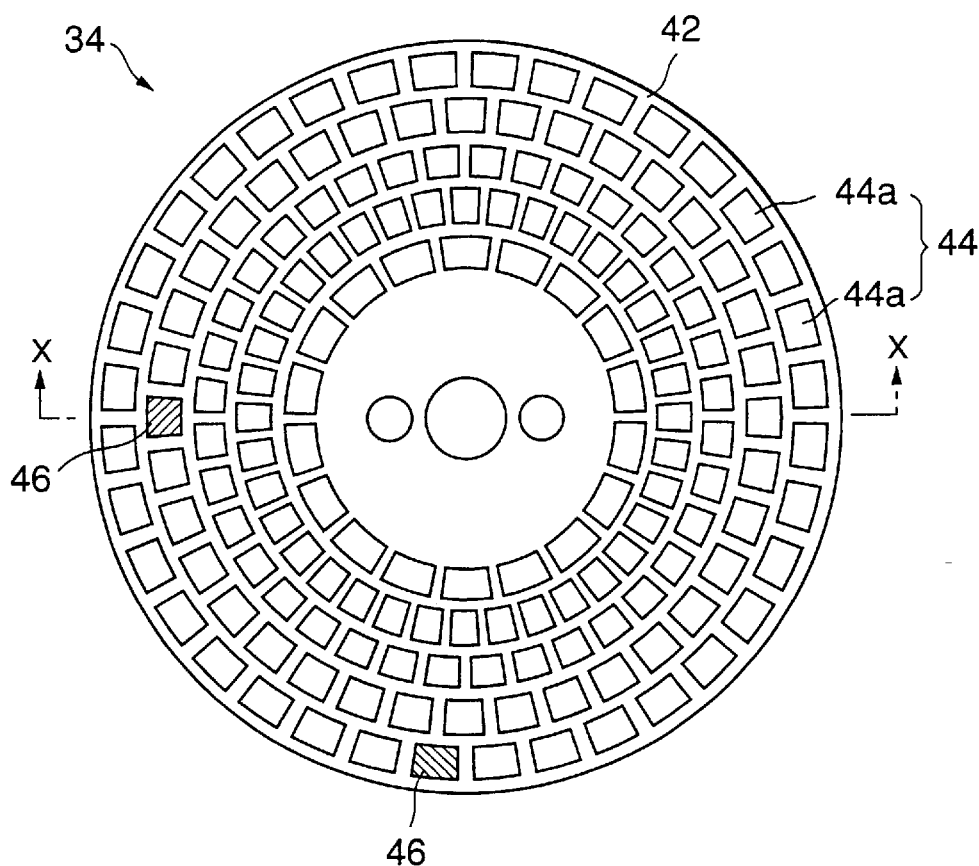
FIGS. 2A and 2B are plan and lateral cross-sectional views, respectively, of the rotor plate used in an embodiment of the rotary head drum apparatus rotation balance control mechanism according to the present invention.
Figure 2B:
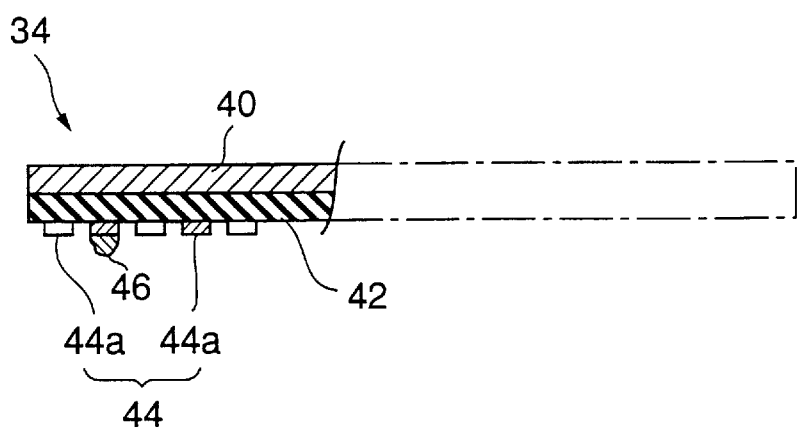

FIG. 1 is a schematic cross-sectional view of an embodiment of a rotary head drum apparatus rotation balance control mechanism according to the present invention. FIGS. 2A and 2B are plan and lateral cross-sectional views, respectively, of the rotor plate used in an embodiment of the rotary head drum apparatus rotation balance control mechanism according to the present invention.

In the embodiment shown in FIG. 1, a rotary head drum apparatus 10 mounts a rotary drum 12, a fixed drum 14 and a drum motor unit 16. It should be noted that the fixed drum 14 is mounted on a drum base 18 and that the drum base 18 is mounted in an inclined or tilted state on a chassis not shown in the diagram.

The rotary drum 12 supports a plurality of magnetic heads 18, and is mounted so as to freely rotate above the fixed drum 14. A shaft 20 that supports the rotary drum 12 is an output axis of the drum motor unit 16, which is provided at a lower portion of the fixed drum 14 such that the rotary drum 12 is urged in a direction of rotation by the drum motor 16. Additionally, a printed circuit board not shown in the drawing is provided on an upper portion of the rotary drum 12, with a rotor core 22a of a rotary trans 22 provided on an interior portion.

As described above, the fixed drum 14 is fixedly mounted on the drum base 18, with a stator core 22b provided at a position opposite the rotor core 22a. A lead wire 24 is mounted on the stator core 22b. Bearings 26a, 26b are provided at a position of the fixed drum 14 opposite the shaft 20.

As described above, the drum motor unit 16 is provided at a lower portion of the fixed drum 14, with the above-described shaft 20 fixedly mounted on a shaft mount 28. A yoke 30 extends from the shaft mount 28. A magnet 32 is mounted on the yoke 30. A rotor plate 34 extends from a bottom edge of the shaft mount 28 so as to oppose the yoke 30. A stator substrate 36 mounting a plurality of coils not shown in the drawing is provided in a space between the rotor plate 34 and the yoke 30 on which the magnet 32 is mounted. The stator substrate 36 is engaged by the drum base 18, with a lead wire 38 extending from an edge of the stator substrate 36.

As shown in FIGS. 2A and 2B, a first layer 40 of a side of the rotor plate 34 opposite the stator substrate 36 of the drum motor unit 16 is formed of silicon steel, with an entirety of a back surface of this first layer 40 covered by a second layer 42 formed from an insulating material. A solder mount 44 made of copper foil is formed on a back surface of this second layer 42, with a plurality of substantially trapezoidally shaped solder portions 44a formed in concentric offset circles about a center of the rotor plate 34 on the solder mount 44. The solder portions 44a are spaced a predetermined distance apart from each other. These solder portions 44a may be formed, for example, by a photoresist method. Additionally, soldering 46 is formed on a number of solder portions 44a and functions as a balance weight.

According to the above-described embodiment, though the rotary drum 12 is rotated at high speed by the drum motor unit 16 the rotary drum 12 generates no oscillations because the rotation balance is optimal. Additionally, the soldering 46 that comprises the balance weight does not fly off the rotor plate 34. Moreover, it is a simple matter to accurately adjust the rotation balance in the event that oscillations do reoccur. As a result, the track of the head is smooth, reducing the adverse effects of poor head tracking on the apparatus itself as well as on the magnetic tape.

Additionally, silicon steel is used as the material for the first layer 40 of the rotor plate 34 in order to properly form a magnetic path of the magnet 32, thus improving motor efficiency. Additionally, a second layer 42 is formed on the rotor plate 34 using an insulating material, thus providing a good electromagnetic shield. Additionally, the individual solder portions 44a are spaced a predetermined distance apart, thus reducing heat dissipation outward toward the periphery of the rotor plate 34.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope of the present invention. Specifically, portions of the rotor plate other than the solder mount may be made of material different from the solder material as necessary.

The present application is based on Japanese priority application No. 10-368098 filed on Dec. 24, 1998, the entire contents of which are hereby incorporated by reference.

What is claimed is:

1. A rotation balance control mechanism controlling a rotation balance of a rotary head drum apparatus, the rotation balance control mechanism comprising:

a fixed drum;

a rotary drum freely rotatable above the fixed drum;

a drum motor unit linked to the rotary drum via a shaft having a shaft mount at near one end of the shaft, wherein the drum motor unit urges the rotary drum for rotational motion, the drum motor unit comprising:
   a first yoke, which is connected to the shaft mount, for mounting a magnet;
   a rotor plate also connected to the shaft mount at a gap away from the first yoke,
      wherein the rotor plate has a solder mount formed on at least one surface of the rotor plate for mounting a balance weight of solderable material on the solder mount for controlling the rotation balance of the rotary head drum apparatus, and
      further wherein the rotor plate acts as another yoke for effectively utilizing the magnetic flux of the magnet mounted on the first yoke; and
   a stator substrate having a coil mounted thereto and being disposed in the gap between the first yoke and the rotor plate.

2. The rotation balance control mechanism as claimed in claim 1, wherein the solder mount comprises a plurality of solder portions arranged in concentric offset circles around a center point of the rotor plate.

3. The rotation balance control mechanism as claimed in claim 1, wherein the rotor plate is made of silicon steel.

4. The rotation balance control mechanism as claimed in claim 1, wherein the rotor plate is made of zinc-plated steel.

5. The rotation balance control mechanism as claimed in claim 1, wherein the rotor plate further comprises:

a first layer comprising a silicon steel plate and having two sides, one side being near the stator substrate of the drum motor; and a second layer comprising an insulating material adjoining the other side of the first layer, wherein the solder mount is formed on the second layer.

6. The rotation balance control mechanism as claimed in claim 1, wherein the rotor plate further comprises:

a first layer comprising a zinc-plated steel plate and having two sides, one side being near the stator substrate of the drum motor; and a second layer comprising an insulating material adjoining a the other side of the first layer, wherein the solder mount is formed on the second layer.

7. The rotation balance control mechanism as claimed in claim 1, wherein the rotor plate further comprises:

a first layer comprising a steel plate and having two sides, one side being near the stator substrate of the drum motor; and a second layer comprising an insulating material adjoining the other side of the first layer, wherein the solder mount is formed on the second layer.

* * * * *